United States Patent [19]

De Rossi

[11] 4,066,817
[45] Jan. 3, 1978

[54] RELEASE COATING FOR ALUMINUM AND TINPLATE STEEL COOKWARE

[75] Inventor: Frank De Rossi, Zion, Ill.

[73] Assignee: The Dexter Corporation, Windsor Locks, Conn.

[21] Appl. No.: 665,638

[22] Filed: Mar. 10, 1976

[51] Int. Cl.[2] .......................... B32B 15/08; B32B 15/18; B32B 15/20

[52] U.S. Cl. .......................... 428/339; 428/331; 428/332; 428/333; 428/421; 428/422; 428/447; 428/450; 428/451; 428/454; 428/461; 427/405; 427/309; 148/6.14 R; 220/64; 260/42.27; 260/37 SB

[58] Field of Search .................. 148/6.14 R; 428/421, 428/422, 461, 447, 454, 450, 451, 331, 332, 339, 333; 427/405; 220/64

[56] References Cited

U.S. PATENT DOCUMENTS

| | | | |
|---|---|---|---|
| 3,062,764 | 11/1962 | Osdal | 428/422 X |
| 3,304,216 | 2/1967 | Eggleton | 428/422 X |
| 3,390,203 | 6/1968 | Engelhardt | 428/422 X |
| 3,441,431 | 4/1969 | Pittman et al. | 428/422 |
| 3,560,244 | 2/1971 | Neuroth | 428/461 X |
| 3,734,763 | 5/1973 | Plueddemann | 428/461 X |
| 3,925,276 | 12/1975 | Merrill | 260/18.5 |

*Primary Examiner*—P. C. Ives
*Attorney, Agent, or Firm*—Merriam, Marshall & Bicknell

[57] ABSTRACT

Aluminum and tinplate steel cookware is coated with a finely divided fluorocarbon polymer dispersed in a silanol-containing organopolysiloxane resin to provide a release coating which may be cured at temperatures which do not interfere with the metallurgical properties of the aluminum or the tinplate steel cookware.

8 Claims, No Drawings

RELEASE COATING FOR ALUMINUM AND TINPLATE STEEL COOKWARE

The present invention relates to aluminum cookware having a food release coating on its surfaces which come in contact with the food, wherein the food release coating comprises a finely divided fluorocarbon polymer dispersed in a silanol-containing organopolysiloxane resin. More particularly, the present invention relates to aluminum cookware or tinplate steel cookware coated with a release coating, which can be permanently applied to the cookware and cured under conditions which do not interfere with the metallurgical properties of the cookware. Still more particularly, the present invention relates to aluminum cookware or tinplate steel cookware having release coatings thereon, which release coatings are especially useful in baking or cooking food containing sugar.

The prior art has described release coatings fabricated from polytetrafluoroethylene which is fused to the surface of the substrate. However, the temperatures required to fuse the polytetrafluoroethylene powder to the substrates have undesirably affected the metallurgical properties of the substrates and required, in the case of aluminum cookware, the need to re-anneal the substrate after the release coating has been fused thereon. In addition to requiring additional handling and processing and the expenditure of additional wasteful energy in the re-annealing process, the metallurgical properties of the re-annealed product are not always equivalent to the metallurgical properties of the original product.

Alternatively, the prior art has described many siloxane-based resins which are designed for application to various types of cookware to give either temporary or permanent food release. However, the food release characteristics of such siloxane compositions have not been as good as the fluorocarbon-based coatings.

The present invention provides a release coating which has outstanding food releasability and which may be applied to aluminum cookware or tinplate steel cookware and cured thereon without disturbing the metallurgical properties.

The coating described in the present invention exhibits excellent adhesion to properly prepared aluminum substrate without use of a primer. The food releasing properties of the coating will not diminish after repeated use of the cookware. Simply soapy water rinsing will normally work off any residual food particles from the used bakeware.

The release coatings of the present invention comprise a narrowly defined silanol-containing organopolysiloxane resin having dispersed therein a finely divided, particulate fluorocarbon polymer. As is explained below, it is generally desirable to include pigments, wetting agent, leveling agents, and catalysts in the coating composition and to dissolve or disperse the solids of the coating in sufficient organic solvents to permit the coating to be sprayed.

The present invention contemplates the use of a silanol-containing organopolysiloxane resin prepared by the acetone-water hydrolysis of an organohalasilene blend consisting essentially of 60 mole percent methyltrichlorosilane, 35 mole percent phenyl trichlorosilane and about 5% mole dimethyl dichloro silane. Such resins and the production thereof are described in U.S. Pat. No. 3,925,276 which issued Dec. 9, 1975, the disclosure of which is specifically incorporated herein.

The fluorocarbon polymers which may be used in the coating may vary over a wide range. Fluorocarbon polymers which have been found to be suitable for the purposes of this invention are those fluorocarbon polymers having a molecular weight in the range of about 250,000 to about 750,000 and in the form of solid, fine particles. These particles may be of a size in the range of about ½ micron to about 10 microns, and an average particle size of about 5 microns or less. By the term "fluorocarbon polymers," as used hereinafter and in the appended claims, it is meant the polymers formed from ethylene, propylene, butylene and copolymers thereof, which are completely fluorine saturated, e.g., tetrafluoroethylene polymers or substituted with fluorine and chlorine e.g., chloro-trifluoroethylene polymers and copolymers such as tetrafluoroethylene-hexafluoropropylene polymers, tetrafluoroethylene-octofluorobutylene polymers, etc. Such polymers are formed by the method now known to those skilled in the art from the fluoro-, or fluorochloro-substituted monomers by polymerization in a non-reactive solvent, e.g., trichlorotrifluoroethane, to the desired molecular weight and effecting termination of the polymerization by adding a non-polymerizable component capable of joining to the polymer to provide a terminating end group, such as methanol, isopropanol, butanol, carbon tetrachloride, etc. A preferred group of such polymers are those having an average molecular weight in the range of 400,000–700,000, with the best results, to date, having been achieved with tetrafluoroethylene polymers having an average molecular weight of about 600,000.

Good results have been achieved using a commercially available chloro-trifluoroethylene polymer sold under the tradename TL-340 by Liquid Nitrogen Processing Corp. This material has the following typical characteristics:

| | |
|---|---|
| Particle Size (Micromerograph) | |
| Maximum | 33 microns |
| 90% Below | 21 microns |
| 50% Below | 13 microns |
| Coefficient of Friction: | 0.09–0.15 |
| Oil Absorption: ASTM D1483 | 98.6 |
| Critical Surface Tension: dynes/cm | 31.0 |
| Melt Point: | 390° F. |
| Specific Gravity: | 2.1 |
| Molecular Weight: | 250–750,000 |

This material is preferred since it complies with FDA Regulation 121-2523. Other polymers such as fluorinated ethylene propylene polymers may also comply with FDA Regulation 121-2523.

The particle size of the fluorocarbon polymer may be reduced during the production of the coating during the pigment grinding operation. Further, it is usually advantageous to grind the pigments, if any, with the fluorocarbon polymer in order to obtain a uniform particle size and to eliminate all agglomerates.

The coating compositions of the present invention include an adequate quantity of pigments to give the desired color. Titanium dioxide is the preferred pigment for the preparation of white or light colored coatings, but it is understood that other pigments may be used. If pigments are used, it is generally preferred to use a greater quantity of the fluorocarbon polymer, since pigments, generally speaking, reduce the slip of coatings. Finally, it is contemplated that the coating compositions of the present invention also include a catalyst for catalyzing the curing of the silicone resin described above. Generally iron or zinc salts such as iron octoate or zinc octoate have been demonstrated to be useful catalysts. Optionally, material such as soya lecithin, a wetting agent, and anti-settling agents such as bentonite may also be used. Suitable silicone fluids may also be added to the coating composition. Suitable silicone fluids include conventional mixtures of methylphenyl siloxanes, dimethyl siloxanes and/or diphenyldimethyl siloxanes.

The coating composition of the present invention, with respect to the solids content, comprises from about 35 to about 60% weight of the organopolysiloxane resin, with approximately 50% by weight being preferred. The coating composition may comprise up to 25% by weight of the finely divided fluorocarbon polymer, but about 16.5% by weight is generally preferred.

The pigments preferably comprise from about 10% to about 40% by weight of the solids of the coating composition. In the case of titanium dioxide it has been found that about 32% by weight of the solids produces good results when combined with about 16 parts of a fluorocarbon polymer and about 50 parts of the organopolysiloxane. It has also been found that 1 to 2% by weight of bentonite may be used along with an equal amount of lecithin and sufficient catalyst to cure the resin. Generally from about 0.1 to about 1% by weight, based on the weight of the resin, of the catalyst produce curing in a reasonable period of time.

As was mentioned above, it is desired to disperse or dissolve the coating composition in a solvent mixture. A wide variety of conventional solvents may be used in such proportions as may be necessary to achieve the desired viscosity and rheology for coating.

The coating composition preferably contains about 50% solids, although for some applications lower solids compositions may be desired. Generally the solids content may run from as little as 20% to about 70% by weight solids.

The coating compositions of the present invention are manufactured in a conventional manner. It is generally preferred to pebble mill the pigments and the fluorocarbon polymer with a portion of the silicone resin, in order to thoroughly wet the pigment and slip agent. A Hegman grind of 5 is deemed satisfactory. Thereafter the balance of the materials are added with stirring to produce a coating composition.

The coating compositions may be applied to various substrates, but it has been found that these coating compositions are most advantageously applied to aluminum or tinplate steel cooking utensils. The coating compositions of the present invention are particularly adapted to be applied to light gauge metal substrates, since the coatings of the present invention cure at relatively low temperatures, which do not distort the metallurgical properties of the metal substrates. The coating compositions are sprayed to give film thicknesses of 0.75 through 1.7 mils which is thereafter cured by placing it in an oven for 15 minutes at a temperature of 450° F. Such treatment achieves a metal temperature of about 425° F., which does not interfere with the metallurgical properties of the aluminum substrate.

It is generally preferred to keep aluminum substrates below 500° F., since severe softening may take place above that temperature, wherein the substrates tend to distort. The distortion is particularly severe in the case of lightweight substrates. It is also preferred to cure tinplate steel substrates at similar temperatures. Higher temperatures cause flowing of the tin, which results in loss of adhesion.

It is generally necessary, in order to obtain maximum adhesion of the coating, to pretreat the substrate prior to coating. Suitable pretreatments include shot blasting, sand blasting, caustic etching, acid etching, Bonderite 701 or the like. Since castings, such as aluminum castings, have a coarse, grainy surface, pretreatment may not be necessary for good results.

The following examples will serve to illustrate the preparation of the non-stick coating composition of the present invention and the application thereof to an exemplary aluminum cooking utensil, but it is understood that the examples are set forth merely for illustrative purposes and many other coating compositions are within the scope of the present invention.

EXAMPLE 1

This example illustrates the preparation of a silanol-containing organopolysiloxane release resin and release resin coating mixture according to this invention.

A reaction flask equipped with a condenser, agitator and thermometer is charged with 3,000 parts of water, 900 parts of toluene, and 900 parts of acetone. There are added to the mixture in the reaction flask in a dual feed with 900 parts of acetone through a common dip leg, a silane blend consisting of 526 parts of methyltrichlorosilane, 436 parts of phenyltrichlorosilane, and 38 parts of dimethyldichlorosilane. The rate of addition is controlled for 30 minutes maintaining a peak reaction temperature below 45° C. The mixture is stirred for 15 minutes, and allowed to settle for 15 minutes. The acid water (bottom) layer is drawn off and discarded. Ten percent water based on resin solids is charged to the resin layer and the mixture is agitated for 5 minutes, and settled for 15 minutes. The excess water is drawn off and discarded. The washed hydrolyzate is filtered through a mixture of Celite 545 and Fuller's earth. The filtered hydrolyzate is atmospherically stripped to 120° C. One percent Celite 545 based on resin solids is added to the resin concentrate and the solvent is stripped off to 140° C total reflux. The condensate is trapped off and the resin is bodied at about 160° C in the presence of iron octoate to an endpoint to give a final viscosity of 9–12 centiposies (cps) at 25° C on an LVF Brookfield Viscometer at 20% solids.

Two hundred and sixty-seven parts of the above organopolysiloxane resin was blended with 134 parts of $TiO_2$, 5.5 parts of bentonite, 1.5 parts of soya lecithin and 67 parts of chlorotetrafluoroethylene polymer, to which 178 parts of perchloroethylene and 90 parts of xylene were added and the whole mixture was ground in a pebble mill for approximately 40 hours.

After pebble milling, an additional 129 parts of the organopolysiloxane resin, 72 parts of xylene, 33 parts of mineral spirits, 24 parts of cellosolve acetate, 2.75 parts of zinc and 1.15 parts of iron octoate and 6 parts of a compatible silicone fluid were added.

The resulting coating composition had the following physical constants:

| | |
|---|---|
| Viscosity (on Zahn #2 cup) | 20 sec. |
| Weight per gallon | 10.0 lbs. |

-continued

| | |
|---|---|
| Solids | 40%. |

The above coating is applied by spray to properly prepared aluminum substrate and cured for 15 minutes at a temperature of 450°-475° F. The baked film is semi-gloss in appearance, exhibits good adhesion to the substrate and offers a hard, slippery surface. Sweet goods baked on utensils coated with the above-described composition release easily from the utensil even after repeated uses. Also, the cooking utensil can be cleaned with a simple mild detergent rinse.

EXAMPLE 2

Using the procedure described in Example 1, a medium grey coating was prepared.

The following materials were mixed together and pebble milled for 40 hours:

| | Parts |
|---|---|
| Titanium dioxide | 100 |
| Carbon black | 8 |
| 50% soya lecithin in xylene | 3 |
| Silicone resin of Example 1 | 250 |
| Chlorotetrafluoroethylene | 50 |
| Perchloroethylene | 160 |
| Xylene | 60 |

After the pebble milling operation, the following materials were added:

| | Parts |
|---|---|
| Silicone resin of Example 1 | 150 |
| Aromatic solvent | 50 |
| Mineral spirits | 30 |
| Cellosolve acetate | 25 |
| Zinc octoate | 3 |
| Iron octoate | 1 |
| Silicone fluid | 10 |
| Total | Total 902 |

The resulting composition had a viscosity of 23 seconds, a weight per gallon of 9.70 lbs., contained 40% nonvolatile material and had a medium gloss.

The coating composition was applied to aluminum substrates in the same manner as described in Example 1 and gave comparable results.

EXAMPLE 3

A black coating composition was produced using the procedure described in Example 1.

The following materials were mixed together and pebble milled for 40 hours:

| | Parts |
|---|---|
| Carbon black | 20 |
| Chlorotetrafluoroethylene | 48 |
| 50% soya lecithin in xylene | 3 |
| Silicone resin of Example 1 | 220 |
| Perchloroethylene | 160 |
| Bentonite | 4.5 |
| Ethyl alcohol | 9 |
| Aromatic solvent | 30 |

After the pebble milling operation, the following materials were added:

| | Parts |
|---|---|
| Silicone resin of Example 1 | 240 |

-continued

| | Parts |
|---|---|
| Cellosolve acetate | 50 |
| Butyl alcohol | 27 |
| Toluene | 80 |
| Zinc octoate | 3.5 |
| Iron Octoate | 1.2 |
| Silicone fluid | 12 |
| Total | 908.2 |

The resulting composition had a viscosity of 20 seconds, a weight per gallon of 9.10 lbs., contained 34% nonvolatile material and had a medium gloss.

The forms of invention herein shown and described are to be considered only as illustrative. It will be apparent to those skilled in the art that numerous modifications may be made therein without departure from the spirit of the invention or the scope of the appended claims.

I claim:

1. A metal cooking utensil having a food contacting surface formed of a cured, adherent film having food release properties, which comprises:

a metal cooking utensil formed of metal from the group consisting of aluminum and tinplate steel, and having a cured, adherent surface film with food release properties;

said cured film being formed of a silanol-containing organopolysiloxane resin having fine particles of a fluorocarbon polymer dispersed therein and siloxane fluid;

said silanol-containing organopolysiloxane resin being the acetone-water hydrolysis product of an organo-halosilane blend consisting essentially of about 60 mole percent of methyltrichlorosilane, about 35 mole percent of phenyltrichlorosilane, and about 5 mole percent of dimethyldichlorosilane, and having an average ratio of about 1.05 organo radicals per silicon atom;

said fluorocarbon polymer being a member selected from the group consisting of completely fluorinated and fluoro-chlorinated polymers of $C_2$-$C_4$ olefins, having a molecular weight of at least about 250,000, and being in the form of fine particles;

the percent by weight of organopolysiloxane resin and flurocarbon polymer present in said cured film being about 35 to 60 percent by weight of organopolysiloxane resin and up to about 25 percent by weight of the fluorocarbon polymer.

2. The cooking utensil of claim 1, wherein the fluorocarbon polymer comprises a tetrafluoroethylene polymer.

3. The cooking utensil of claim 1, wherein the fine particles of the fluorocarbon polymer comprises a chloro-trifluoroethylene polymer having particles of a size within the range of about ½ to about 10 microns.

4. The cooking utensil of claim 1, wherein said cured film is cured at temperatures of less than about 500° F.

5. A metal cooking utensil having a food contacting surface formed of a cured, adherent film having food release properties, which essentially consists of:

a metal cooking utensil formed of metal from the group consisting of aluminum and tinplate steel, and having a cured, adherent, pigmented surface film with food release properties;

said cured film being formed of a silanol-containing organopolysiloxane resin having pigment and fine particles of a fluorocarbon polymer dispersed therein and siloxane fluid;

said silanol-containing organopolysiloxane resin being the hydrolysis product of an organohalosilane blend consisting essentially of about 60 mole percent of methyltrichlorosilane, about 35 mole percent of phenyltrichlorosilane, and about 5 mole percent of dimethyldichlorosilane in the presence of water, acetone and a water-immiscible organic solvent, and having an average ratio of about 1.05 organo radicals per silicon atom;

said fluorocarbon polymer being a member selected from the group consisting of completely fluorinated and fluorochlorinated polymers of $C_2$–$C_4$ olefins, having a molecular weight in the range of from about 250,000 to about 750,000, and being in the form of fine particles;

the percent by weight of organopolysiloxane resin, fluorocarbon polymer and pigment present in said cured film being about 35 to 60 percent by weight of organopolysiloxane resin, up to about 25 percent by weight of the fluorocarbon polymer, and about 10 to 40 percent by weight of pigment.

6. The cooking utensil of claim 5, wherein the fluorocarbon polymer is tetrafluoroethylene polymer.

7. The cooking utensil of claim 5, wherein the fine particles of the fluorocarbon polymer is chlorotrifluoroethylene polymer having particles of a size within the range of about ½ to about 10 microns.

8. The cooking utensil of claim 5, wherein said cured film is cured at temperatures of less than about 500° F.

* * * * *

UNITED STATES PATENT AND TRADEMARK OFFICE
CERTIFICATE OF CORRECTION

PATENT NO. : 4,066,817
DATED : January 3, 1978
INVENTOR(S) : Frank De Rossi

It is certified that error appears in the above-identified patent and that said Letters Patent are hereby corrected as shown below:

Page 1, "References Cited" in second column, insert as the second listed reference --3,293,203  12/1966  Paulus  260/37--; column 1, second line from the bottom, substitute --mole %-- for "% mole" before "dimethyl"; and, column 2, line 12, substitute --polymer,'"-- for "polymers,'".

Signed and Sealed this

Eleventh Day of April 1978

[SEAL]

Attest:

RUTH C. MASON
Attesting Officer

LUTRELLE F. PARKER
Acting Commissioner of Patents and Trademarks